(12) United States Patent
Yang et al.

(10) Patent No.: US 12,372,020 B2
(45) Date of Patent: Jul. 29, 2025

(54) PREPARATION OF SCR CATALYST COMPRISING Cu AND Fe-EXCHANGED ZEOLITE, SAID CATALYST, SYSTEM COMPRISING SAID CATALYST AND EXHAUST GAS TREATMENT USING SUCH

(71) Applicant: BASF Corporation, Florham Park, NJ (US)

(72) Inventors: Jeff H. Yang, Iselin, NJ (US); Wen-Mei Xue, Iselin, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 50 days.

(21) Appl. No.: 18/266,015

(22) PCT Filed: Dec. 8, 2021

(86) PCT No.: PCT/EP2021/084733
§ 371 (c)(1),
(2) Date: Jun. 8, 2023

(87) PCT Pub. No.: WO2022/122799
PCT Pub. Date: Jun. 16, 2022

(65) Prior Publication Data
US 2024/0068387 A1 Feb. 29, 2024

(30) Foreign Application Priority Data
Dec. 9, 2020 (EP) .................................... 20212706

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01J 29/072* (2013.01); *B01J 37/0215* (2013.01); *B01J 37/08* (2013.01); *B01J 37/30* (2013.01); *F01N 3/035* (2013.01); *F01N 3/106* (2013.01); *F01N 13/009* (2014.06); *B01D 53/9422* (2013.01); *B01D 53/9427* (2013.01); *B01D 53/9445* (2013.01); *B01D 2255/50* (2013.01); *B01D 2258/01* (2013.01); *F01N 3/0814* (2013.01); *F01N 3/0871* (2013.01); *F01N 3/208* (2013.01); *F01N 2250/02* (2013.01); *F01N 2570/14* (2013.01)

(58) Field of Classification Search
CPC ...... F01N 3/035; F01N 3/0814; F01N 3/0871; F01N 3/206; F01N 3/2066; F01N 3/208; F01N 3/101; F01N 3/103; F01N 3/106; F01N 13/009; F01N 2250/02; F01N 2370/04; F01N 2570/14; B01D 53/8621; B01D 53/8625; B01D 53/9418; B01D 53/9422; B01D 53/9427; B01D 53/9445; B01D 53/9477; B01D 2253/106; B01D 2255/50; B01D 2258/01; B01D 2255/20738; B01D 2255/20761; B01J 21/06; B01J 29/0356; B01J 29/072; B01J 29/14; B01J 29/24; B01J 29/46; B01J 29/56; B01J 29/68; B01J 29/76; B01J 29/7615; B01J 29/763; B01J 35/56; B01J 37/0215; B01J 37/0246; B01J 37/08; B01J 37/30; B01J 37/0219; B01J 2229/186; B01J 2229/42; B01J 2523/41; Y02T 10/12
See application file for complete search history.

(56) References Cited

U.S. PATENT DOCUMENTS 8,293,199 B2   8/2012   Beutel et al.
10,315,924 B2  6/2019   Feyen et al.
(Continued)

FOREIGN PATENT DOCUMENTS

EP      3549913 A1    10/2019
WO   2011/064186 A1    6/2011
(Continued)

OTHER PUBLICATIONS

Yang, Xiaofan et al., "Heterometal Incorporation in Metal-Exchanged Zeolites Enables Low-Temperature Catalytic Activity of NOx Reduction", The Journal of Physical Chemistry C, vol. 116, No. 44, Nov. 8, 2012,, pp. 23322-23331.
(Continued)

*Primary Examiner* — Binh Q Tran
(74) *Attorney, Agent, or Firm* — DLA Piper LLP (US)

(57) ABSTRACT

The present disclosure relates to a process for preparing a catalyst for the selective catalytic reduction of nitrogen oxide. The process includes providing a zeolitic material comprising $SiO_2$ and $X_2O_3$ in its framework structure, wherein X is a trivalent element; subjecting the zeolitic material to an ion exchange procedure with one or more copper (II) containing compounds; preparing a slurry comprising the Cu ion-exchanged zeolitic material, one or more iron (II) and/or iron (III) containing compounds, and a solvent system; providing a substrate and coating the slurry onto the substrate; and calcining the coated substrate. Furthermore, the present disclosure relates to a catalyst for the selective catalytic reduction of nitrogen oxide, an exhaust gas treatment system for the treatment of exhaust gas exiting from an internal combustion engine, and a method for the selective catalytic reduction of nitrogen oxides.

14 Claims, 1 Drawing Sheet

(51) Int. Cl.
    *B01J 29/072*  (2006.01)
    *B01J 37/02*   (2006.01)
    *B01J 37/08*   (2006.01)
    *B01J 37/30*   (2006.01)
    *F01N 3/035*   (2006.01)
    *F01N 3/08*    (2006.01)
    *F01N 3/10*    (2006.01)
    *F01N 13/00*   (2010.01)

(56) References Cited

U.S. PATENT DOCUMENTS

| | | | |
|---|---|---|---|
| 2011/0076229 A1* | 3/2011 | Trukhan | B01J 37/30 |
| | | | 423/351 |
| 2011/0305614 A1 | 12/2011 | Stiebels et al. | |
| 2013/0202524 A1* | 8/2013 | Maurer | B01J 35/30 |
| | | | 423/709 |
| 2013/0224082 A1 | 8/2013 | Narula et al. | |
| 2016/0325228 A1* | 11/2016 | Feyen | B01D 53/9418 |
| 2019/0134615 A1* | 5/2019 | Wen | B01J 29/78 |
| 2019/0168199 A1* | 6/2019 | Yang | F01N 3/035 |
| 2021/0172361 A1* | 6/2021 | Hilgendorff | B01J 37/0045 |
| 2021/0370278 A1* | 12/2021 | Parvulescu | B01J 35/40 |
| 2021/0387145 A1* | 12/2021 | Maurer | B01J 35/638 |
| 2022/0258141 A1* | 8/2022 | Liu | B01J 37/082 |

FOREIGN PATENT DOCUMENTS

| | | |
|---|---|---|
| WO | 2015/101930 A1 | 7/2015 |
| WO | 2016/070090 A1 | 5/2016 |
| WO | 2017/134581 A1 | 8/2017 |
| WO | 2017/153894 A1 | 9/2017 |
| WO | 2021/198276 A1 | 10/2021 |

OTHER PUBLICATIONS

Sultana, Asmina et al., "Tuning the NOx conversion of Cu—Fe/ZSM-5 catalyst in MH3-SCR", Catalysis Communications, vol. 41, Jul. 5, 2013, pp. 21-25.

Jouini, Houda et al., "Characterization and NH3-SCR reactivity of Cu—Fe-ZSM-5 catalysts prepared by solid state ion exchange: The metal exchange order effect", Microporous and Mesoporous Materials, vol. 260, Oct. 28, 2017, pp. 217-226.

International Search Report and Written Opinion from corresponding PCT International Patent Application No. PCT/EP2021/084733 dated May 2, 2022.

Yang, Xiaofan et al., "Heterometal Incorporation in Metal-Exchanged Zeolites Enables Low-Temperature Catalytic Activity of NOx Reduction" Supporting Information, The Journal of Physical Chemistry C, vol. 116, No. 44, Nov. 8, 2012,, pp. 1-23.

International Preliminary Report on Patentability and Written Opinion from corresponding PCT International Application No. PCT/EP2021/084733 dated Jun. 22, 2023.

\* cited by examiner

PREPARATION OF SCR CATALYST COMPRISING Cu AND Fe-EXCHANGED ZEOLITE, SAID CATALYST, SYSTEM COMPRISING SAID CATALYST AND EXHAUST GAS TREATMENT USING SUCH

TECHNICAL FIELD

The present invention relates to a process for preparing a catalyst for the selective catalytic reduction of nitrogen oxide as well as to a catalyst for the selective catalytic reduction of nitrogen oxide obtained according to the inventive process and to its use. Furthermore, the present invention relates to an exhaust gas treatment system for the treatment of exhaust gas exiting from an internal combustion engine, preferably from a diesel engine, the system comprising a catalyst for the selective catalytic reduction of nitrogen oxide according to the present invention. Finally, the present invention relates to a method for the selective catalytic reduction of nitrogen oxides which employs a catalyst for the selective catalytic reduction of nitrogen oxide according to the present invention.

INTRODUCTION

As a trend, the NOx engine out emissions of modern heavy duty diesel engines will increase due to the making of a more fuel efficient engine, and at the same time, the NOx conversion requirements of after-treatment systems will increase. For some engines, NOx conversions of more than 95% are already mandatory. At the same time, it becomes more challenging to fulfill the nitrous oxide ($N_2O$) targets as these targets are in the range of 0.1 to 0.14 g/kWh. Therefore, SCR catalysts with high NOx conversion and moderate to low $N_2O$ formation (<0.1 g/kWh) appears to be mandatory to address the market requirements.

It is well-known that the combination of a Fe-zeolites and Cu-zeolites in one catalytic system can address this optimization requirements. For example, WO 2016/070090 A1 discloses a catalytic article comprising a first molecular sieve promoted with copper and a second molecular sieve promoted with iron. US 2011/0305614 A1 also discloses a catalyst, in particular a selective catalytic reduction (SCR) catalyst comprising a mixture of Cu-CHA and Fe-MFI. Finally, WO 2017/153894 A1 discloses a metal ion-exchanged molecular sieve, a Cu-CHA, which is ion-exchanged with at least one additional metal, preferably Al.

WO 2015/101930 A1, on the other hand, relates to a process for preparing a bimetal-exchanged zeolitic material having a BEA-type framework structure, wherein the process includes a first step of ion exchange with copper followed by a subsequent ion exchange step with iron. Similarly, WO 2017/134581 A1 discloses a process for preparing a zeolite having the CHA-type framework structure which is bimetal-exchanged with iron and copper, wherein the bimetal-exchanged zeolite is subsequently employed for preparing SCR washcoats.

WO 2018/10718 A relates to an in-slurry ion exchange method for preparing either a Cu-ion-exchanged zeolite or an Fe-ion-exchanged zeolite.

In view of the current developments, there therefore remains the need for catalysts which dis-play increasing NOx conversion activities without at the same time leading to an increase in $N_2O$ emissions, in particular after having been subject to aging conditions during prolonged use.

BRIEF DESCRIPTION OF DRAWINGS

The sole FIGURE schematically shows an internal combustion engine having an exhaust gas system in accordance with embodiments of the present disclosure.

DETAILED DESCRIPTION

It was an object of the present invention to provide a selective catalytic reduction catalyst which permits to reduce significantly the $N_2O$ emissions, while maintaining high NOx conversion levels under both standard SCR and fast SCR gas feed conditions as well as a process for preparing a selective catalytic reduction catalyst presenting such catalytic performances. Thus, it has surprisingly been found that by adding iron to a slurry of a copper ion-exchanged zeolite during the preparation of a catalyst lowers the $N_2O$ make, in particular when using higher loadings of copper in the zeolite. Furthermore, it has quite unexpectedly been found according to the present invention that when using lower loadings of copper in the copper ion-exchanged zeolite, the NOx conversion of the resulting catalyst may be boosted by the addition of iron to the slurry during the preparation of the catalyst, without increasing the very low $N_2O$ make. In particular, it has quite surprisingly been found that by adding iron to the slurry of a copper ion-exchanged zeolite, the amount of copper in the copper ion-exchanged zeolite may be lowered for achieving a lower $N_2O$ make without however sacrificing the NOx conversion activity of the resulting catalyst as might have been expected. As a result, it has quite unexpectedly been found that the invention is able to provide an optimum balance between high NOx conversion and low $N_2O$ make, in particular under fast SCR conditions.

Therefore, the present invention relates to a process for preparing a catalyst for the selective catalytic reduction of nitrogen oxide comprising
(1) providing a zeolitic material comprising $SiO_2$ and $X_2O_3$ in its framework structure, wherein X is a trivalent element;
(2) subjecting the zeolitic material provided in (1) to an ion exchange procedure with one or more copper(II) containing compounds;
(3) preparing a slurry comprising the Cu ion-exchanged zeolitic material obtained in (2), one or more iron (II) and/or iron (III) containing compounds, and a solvent system;
(4) providing a substrate and coating the slurry obtained in (3) onto the substrate;
(5) calcining the coated substrate obtained in (4).

According to the present invention, it is preferred that the zeolitic material has a framework type structure selected from the group consisting of LTA, AFT, AFV, SAV, SFW, TSC, FAU, MFI, BEA, FER, MOR, CHA, AEI, RTH, LEV, DDR, KFI, ERI, and AFX, including mixed structures of two or more thereof, more preferably from the group consisting of CHA, AEI, RTH, and AFX, including mixed structures of two or more thereof, wherein more preferably the zeolitic material has a CHA and/or AEI-type framework type structure, preferably a CHA-type framework structure.

According to the present invention, it is preferred that the Fe:Cu molar ratio of the total amount of iron comprised in the slurry prepared in (3), to the total amount of copper contained in the Cu ion-exchanged zeolitic material comprised in the slurry prepared in (3), is comprised in the range of from 0.1 to 15, more preferably of from 0.5 to 10, more preferably of from 0.8 to 7, more preferably of from 1 to 5, more preferably of from 1.5 to 4, more preferably of from 2 to 3.5, more preferably of from 2.5 to 3.2, more preferably of from 2.7 to 3, and more preferably of from 2.8 to 2.9.

According to the present invention, it is preferred that the Cu ion-exchanged zeolitic material obtained in (2) contains Cu, calculated as CuO, in an amount ranging from 0.1 to 8 wt.-% based on 100 wt.-% of $SiO_2$, $Al_2O_3$, and Cu, calculated as CuO, in the Cu ion-exchanged zeolitic material, more preferably from 0.3 to 5 wt.-%, more preferably from 0.5 to 3.5 wt.-%, more preferably from 0.8 to 2.4 wt.-%, more preferably from 1.0 to 1.8 wt.-%, and more preferably from 1.2 to 1.4 wt.-%.

According to the present invention, it is preferred that the catalyst obtained in (5) contains Cu, calculated as CuO, in an amount ranging from 5 to 150 g/ft$^3$, more preferably from 15 to 100 g/ft$^3$, more preferably from 25 to 70 g/ft$^3$, more preferably from 35 to 50 g/ft$^3$, more preferably from 40 to 46 g/ft$^3$, and more preferably from 43 to 44 g/ft$^3$.

According to the present invention, it is preferred that the slurry obtained in (3) contains Fe, calculated as $Fe_2O_3$, in an amount ranging from 0.1 to 8 wt.-% based on 100 wt.-% of the calcined slurry, more preferably from 0.5 to 7 wt.-%, more preferably from 1 to 6 wt.-%, more preferably from 1.5 to 5 wt.-%, more preferably from 2 to 4.5 wt.-%, more preferably from 2.5 to 4 wt.-%, more preferably from 3 to 3.6 wt.-%, and more preferably from 3.2 to 3.4 wt.-%.

According to the present invention, it is preferred that the catalyst obtained in (5) contains Fe, calculated as $Fe_2O_3$, in an amount ranging from 5 to 400 g/ft$^3$, more preferably from 10 to 300 g/ft$^3$, more preferably from 30 to 250 g/ft$^3$, more preferably from 50 to 200 g/ft$^3$, more preferably from 80 to 170 g/ft$^3$, more preferably from 100 to 150 g/ft$^3$, more preferably from 110 to 135 g/ft$^3$, and more preferably from 120 to 125 g/ft$^3$.

According to the present invention, it is preferred that X is selected from the group consisting of Al, B, In, Ga, and combinations of two or more thereof, more preferably from the group consisting of Al, B, In, and combinations of two or more thereof, wherein more preferably X stands for Al and/or B, X preferably being Al.

According to the present invention, it is preferred that the zeolitic material provided in (1) displays an $SiO_2:X_2O_3$ molar ratio in the range of from 1 to 200, more preferably from 5 to 120, more preferably from 10 to 80, more preferably from 15 to 50, more preferably from 20 to 40, more preferably from 25 to 35, and more preferably from 28 to 30.

According to the present invention, it is preferred that the zeolitic material provided in (1) comprises at most 1000 ppm, more preferably from 0 to 100 ppm, and more preferably from 0 to 10 ppm of copper, calculated as the element.

According to the present invention, it is preferred that the one or more copper(II) containing compounds are selected from the group consisting of CuO, copper(II) chloride, copper(II) bromide, copper(II) perchlorate, copper(II) sulfite, copper(II) hydrogensulfate, copper(II) sulfate, copper(II) nitrite, copper(II) nitrate, copper(II) dihydrogenphosphate, copper(II) hydrogenphosphate, copper(II) phosphate, copper(II) hydrogencarbonate, copper(II) carbonate, copper (II) acetate, copper(II) citrate, copper(II) malonate, copper (II) oxalate, copper(II) tartrate, and mixtures of two or more thereof, more preferably from the group consisting of CuO, copper(II) chloride, copper(II) sulfate, copper(II) nitrate, copper(II) acetate, and mixtures of two or more thereof, wherein more preferably the copper(II) containing compound is CuO.

According to the present invention, it is preferred that ion exchange in (2) is conducted in a solvent system comprising one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.

According to the present invention, it is preferred that ion exchange in (2) is conducted at a temperature in the range of from 20 to 100° C., more preferably from 30 to 90° C., more preferably from 40 to 80° C., more preferably from 50 to 70° C., and more preferably from 55 to 65° C.

According to the present invention, it is preferred that ion exchange in (2) is conducted for a duration in the range of from 0.15 to 10 h, more preferably from 0.25 to 5 h, more preferably from 0.5 to 3 h, and more preferably from 0.75 to 1.5 h.

According to the present invention, it is preferred that the one or more iron (II) and/or iron (III) containing compounds are selected from the group consisting of iron sulfate, iron sulfite, iron hydrogensulfate, iron chloride, iron bromide, iron iodide, iron fluoride, iron perchlorate, iron nitrate, iron nitrite, iron phosphate, iron dihydrogenphosphate, iron hydrogenphosphate, iron carbonate, iron hydrogencarbonate, iron acetate, iron citrate, iron malonate, iron oxalate, iron tartrate, hexacyanoferrate salts, ferrocene, and ferrocenium salts, including combinations of two or more thereof, more preferably from the group consisting of iron (III) nitrate, iron (II) acetate, ammonium iron (III) citrate, iron (II) sulfate, and iron (II) oxalate, including combinations of two or more thereof, wherein more preferably iron (III) nitrate and/or iron (II) acetate is employed as the one or more iron (II) and/or iron (III) containing compounds.

According to the present invention, it is preferred that the solvent system in (3) comprises one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.

According to the present invention, it is preferred that the slurry obtained in (3) displays a solids content of 15 to 75 wt.-% based on 100 wt.-% of the slurry, more preferably from 20 to 65 wt.-%, more preferably from 25 to 60 wt.-%, more preferably from 30 to 55 wt.-%, more preferably from 33 to 50 wt.-%, more preferably from 35 to 45 wt.-%, and more preferably from 38 to 42 wt.-%.

According to the present invention, it is preferred that the slurry prepared in (3) further comprises one or more binders, more preferably one or more binders based on Al, Si, and/or Zr, preferably on Al and/or Zr, and more preferably based on Zr, wherein more preferably the slurry prepared in (3) further contains one or more sources of $ZrO_2$ as a binder, wherein the one or more sources of $ZrO_2$ preferably comprise one or more zirconium salts, more preferably one or more zirconium salts selected from the group consisting of zirconyl chloride, zirconium acetate, zirconium acetylacetonate, zirconium hydroxide, zirconium oxynitrate, zirconium carbonate, and zirconium oxychloride, including mixtures of two or more thereof, more preferably from the group consisting of zirconium acetate, zirconium acetylacetonate, zirconium hydroxide, and zirconium carbonate, including mixtures of two or more thereof, wherein more preferably the one or more zirconium salts comprise zirconium acetate, wherein more preferably the slurry prepared in (3) further comprises zirconium acetate as a binder. According to said particular and preferred embodiments, it is preferred that the slurry comprises the one or more binders in an amount ranging from 0.5 to 15 wt.-% based on 100 wt.-% of the calcined slurry, more preferably from 1 to 10 wt.-%, more preferably from 3 to 7 wt.-%, more preferably from 4 to 6 wt.-%, and more preferably from 4.5 to 5.5 wt.-%.

According to the present invention, it is preferred that the slurry prepared in (3) further comprises one or more buffering agents, wherein the one or more buffering agents preferably comprise ammonium acetate, wherein more preferably ammonium acetate is employed as the one or more buffering agents. According to said particular and preferred embodiments, it is further preferred that the pH of the slurry prepared in (3) is adjusted to a pH in the range of from 3 to 6 with the one or more buffering agents, more preferably to a pH in the range of from 3.5 to 5.5, preferably of from 3.8 to 5.2, more preferably of from 4.1 to 4.9, more preferably of from 4.3 to 4.7, and more preferably of from 4.4 to 4.6.

According to the present invention, it is preferred that prior to the coating of the slurry in (4), the slurry obtained in (3) is maintained at a temperature in the range of from 5 to 60° C., more preferably in the range of from 10 to 50° C., more preferably in the range of from 15 to 45° C., more preferably in the range of from 18 to 30° C., and more preferably in the range of from 20 to 25° C. According to said particular and preferred embodiments, it is further preferred that the slurry is maintained at the temperature for a duration in the range of from 0.1 to 72 h, more preferably of from 0.5 to 48 h, more preferably of from 1 to 36 h, more preferably of from 3 to 30 h, more preferably of from 6 to 24 h, more preferably of from 10 to 20 h, more preferably of from 12 to 18 h, and more preferably of from 14 to 16 h.

According to the present invention, it is preferred that the substrate provided in (4) is a wall-flow or a flow-through substrate, more preferably a wall-flow or a flow-through honeycomb substrate, and more preferably a flow-through honeycomb substrate.

According to the present invention, it is preferred that the substrate provided in (4) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite According to the present invention, it is preferred that after (4) and prior to calcination in (5), the coated substrate is dried in a gas atmosphere having a temperature in the range of from 80 to 250° C., more preferably in the range of from 90 to 200° C., more preferably in the range of from 100 to 150° C., more preferably in the range of from 110 to 130° C., the gas atmosphere more preferably being air. According to said particular and preferred embodiments, it is further preferred that drying is performed for a duration in the range of from 10 to 180 minutes, more preferably in the range of from 20 to 120 minutes, more preferably in the range of from 30 to 90 minutes, more preferably in the range of from 40 to 80 minutes.

According to the present invention, it is preferred that calcination in (5) is conducted at a temperature in the range of from 350 to 800° C., preferably in the range of from 400 to 700° C., more preferably in the range of from 450 to 650° C., and more preferably in the range of from 500 to 600° C.

According to the present invention, it is preferred that calcination in (5) is conducted for a duration in the range of from in the range of from 10 to 180 minutes, more preferably in the range of from 20 to 120 minutes, more preferably in the range of from 30 to 90 minutes, more preferably in the range of from 40 to 80 minutes.

According to the present invention, it is preferred that calcination in (5) is conducted in a gas atmosphere containing air, wherein more preferably calcination in (5) is conducted in air.

According to the present invention, it is preferred that the process consists of (1), (2), (3), (4) and (5).

The invention further relates to a catalyst for the selective catalytic reduction of nitrogen oxide obtainable and/or obtained according to any of the particular and preferred embodiments of the inventive process.

Figure 1:
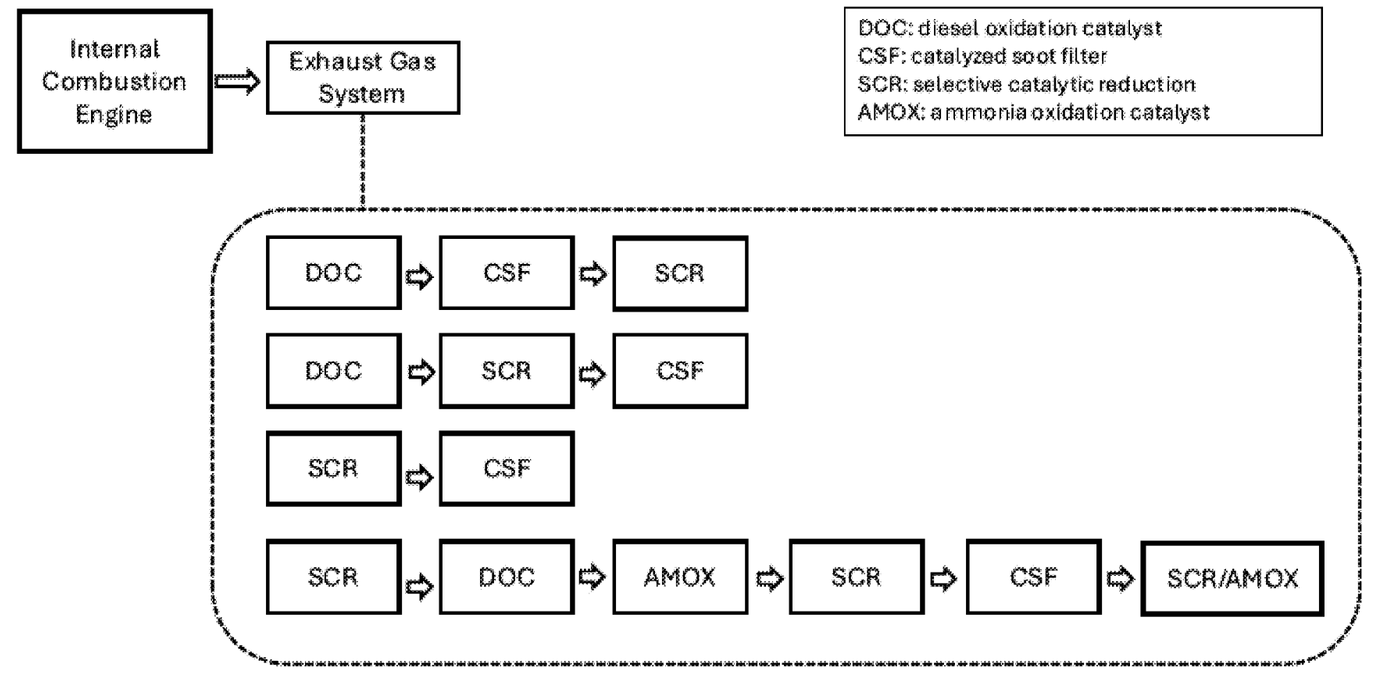

In addition thereto, the present invention also relates to an exhaust gas treatment system for the treatment of exhaust gas exiting from an internal combustion engine (shown in the FIGURE), preferably from a diesel engine, the system comprising a catalyst for the selective catalytic reduction of nitrogen oxide according any of the particular and preferred embodiments of the present invention, and one or more of a diesel oxidation catalyst, an ammonia oxidation catalyst, a selective catalytic reduction catalyst, a catalyzed soot filter and a SCR/AMOx catalyst.

According to the present invention, a system comprising a diesel oxidation catalyst, a catalyzed soot filter and the catalyst for the selective catalytic reduction of nitrogen oxide according to any of the particular and preferred embodiments of the present invention is preferred, wherein the diesel oxidation catalyst is positioned upstream of the catalyzed soot filter and wherein the catalyzed soot filter is positioned upstream of the catalyst for the selective catalytic reduction of nitrogen oxide; wherein the diesel oxidation catalyst preferably is the first catalyst of the system and preferably no catalyst is present between the engine and the diesel oxidation catalyst. Furthermore, it is preferred that the system further comprises a selective catalytic reduction catalyst which is positioned downstream of the catalyst for the selective catalytic reduction of nitrogen oxide; wherein the system preferably further comprises an ammonia oxidation catalyst, said ammonia oxidation catalyst being positioned downstream of the selective catalytic reduction catalyst. Yet further and independently thereof, it is preferred that the system further comprises a reductant injector, wherein the reductant injector is positioned downstream of the catalyzed soot filter and upstream of the catalyst for the selective catalytic reduction of nitrogen oxide, wherein the reductant preferably is urea.

Alternatively, a system according to the present invention comprising a diesel oxidation catalyst, a catalyzed soot filter and the catalyst for the selective catalytic reduction of nitrogen oxide according to any of the particular and preferred embodiments of the present invention is preferred, wherein the diesel oxidation catalyst is positioned upstream of the catalyst for the selective catalytic reduction of nitrogen oxide and wherein the catalyst for the selective catalytic reduction of nitrogen oxide is positioned upstream of the catalyzed soot filter; wherein the diesel oxidation catalyst preferably is the first catalyst of the system and preferably no catalyst is present between the engine and the diesel oxidation catalyst. According to said alternatively preferred embodiments, it is preferred that the system further comprises a selective catalytic reduction catalyst which is positioned downstream of the catalyst for the selective catalytic reduction of nitrogen oxide and upstream of the catalyzed soot filter; wherein the system preferably further comprises an ammonia oxidation catalyst, said ammonia oxidation catalyst being positioned downstream of the selective catalytic reduction catalyst and upstream of the catalyzed soot filter. In addition thereto or independently thereof, it is preferred according to said alternatively preferred embodiments that the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea. Yet further in addition thereto or independently thereof, it is yet further preferred according to said alternatively preferred embodiments that they further comprise a reductant injector, the reductant injector being positioned downstream of the diesel oxidation catalyst and upstream of the catalyst for the selective catalytic reduction of nitrogen oxide, wherein the reductant preferably is urea.

Further alternatively, a system according to the present invention comprising the catalyst for the selective catalytic reduction of nitrogen oxide according to any of the particular and preferred embodiments of the present invention, and a catalyzed soot filter is preferred, wherein the catalyst for the selective catalytic reduction of nitrogen oxide is positioned upstream of the catalyzed soot filter; wherein the catalyst for the selective catalytic reduction of nitrogen oxide preferably is the first catalyst of the system and preferably no catalyst is present between the engine and the catalyst for the selective catalytic reduction of nitrogen oxide. According to said alternatively preferred embodiments, it is preferred that the system further comprises a selective catalytic reduction catalyst which is positioned downstream of the catalyst for the selective catalytic reduction of nitrogen oxide and upstream of the catalyzed soot filter; wherein the system preferably further comprises an ammonia oxidation catalyst, said ammonia oxidation catalyst being positioned downstream of the selective catalytic reduction catalyst and upstream of the catalyzed soot filter. In addition thereto or independently thereof, it is preferred according to said alternatively preferred embodiments that the system further comprises a first reductant injector, the first reductant injector being positioned upstream of the catalyst for the selective catalytic reduction of nitrogen oxide, wherein the reductant preferably is urea. Yet further in addition thereto or independently thereof, it is yet further preferred according to said alternatively preferred embodiments that the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

In addition to the aforementioned, the present invention further relates to a method for the selective catalytic reduction of nitrogen oxides, wherein the nitrogen oxides are comprised in an exhaust gas stream, said method comprising
  (1) providing the exhaust gas stream, preferably from a diesel engine;
  (2) passing the exhaust gas stream provided in (1) through a catalyst for the selective catalytic reduction according to any of the particular and preferred embodiments of the present invention or through an exhaust gas treatment system according to any of the particular and preferred embodiments of the present invention.

Finally, the present invention further relates to the use of a catalyst according to any of the particular and preferred embodiments of the present invention, or of an exhaust gas treatment system according to any of the particular and preferred embodiments of the present invention, for the selective catalytic reduction of nitrogen oxide, preferably of nitrogen oxide exiting from a diesel engine.

The present invention is further illustrated by the following set of embodiments and combinations of embodiments resulting from the dependencies and back-references as indicated. In particular, it is noted that in each instance where a range of embodiments is mentioned, for example in the context of a term such as "The . . . of any one of embodiments 1 to 4", every embodiment in this range is meant to be explicitly disclosed for the skilled person, i.e. the wording of this term is to be understood by the skilled person as being synonymous to "The . . . of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A process for preparing a catalyst for the selective catalytic reduction of nitrogen oxide comprising
    (1) providing a zeolitic material comprising $SiO_2$ and $X_2O_3$ in its framework structure, wherein X is a trivalent element;
    (2) subjecting the zeolitic material provided in (1) to an ion exchange procedure with one or more copper(II) containing compounds;
    (3) preparing a slurry comprising the Cu ion-exchanged zeolitic material obtained in (2), one or more iron (II) and/or iron (III) containing compounds, and a solvent system;
    (4) providing a substrate and coating the slurry obtained in (3) onto the substrate;
    (5) calcining the coated substrate obtained in (4).
2. The process of embodiment 1, wherein the zeolitic material has a framework type structure selected from the group consisting of LTA, AFT, AFV, SAV, SFW, TSC, FAU, MFI, BEA, FER, MOR, CHA, AEI, RTH, LEV, DDR, KFI, ERI, and AFX, including mixed structures of two or more thereof, preferably from the group consisting of CHA, AEI, RTH, and AFX, including mixed structures of two or more thereof, wherein more preferably the zeolitic material has a CHA and/or AEI-type framework type structure, preferably a CHA-type framework structure
3. The process of embodiment 1 or 2, wherein the Fe:Cu molar ratio of the total amount of iron comprised in the slurry prepared in (3), to the total amount of copper contained in the Cu ion-exchanged zeolitic material comprised in the slurry prepared in (3), is comprised in the range of from 0.1 to 15, more preferably of from 0.5 to 10, more preferably of from 0.8 to 7, more preferably of from 1 to 5, more preferably of from 1.5 to 4, more preferably of from 2 to 3.5, more preferably of from 2.5 to 3.2, more preferably of from 2.7 to 3, and more preferably of from 2.8 to 2.9
4. The process of any of embodiments 1 to 3, wherein the Cu ion-exchanged zeolitic material obtained in (2) contains Cu, calculated as CuO, in an amount ranging from 0.1 to 8 wt.-% based on 100 wt.-% of $SiO_2$, $Al_2O_3$, and Cu, calculated as CuO, in the Cu ion-exchanged zeolitic material, preferably from 0.3 to 5 wt.-%, more preferably from 0.5 to 3.5 wt.-%, more preferably from 0.8 to 2.4 wt.-%, more preferably from 1.0 to 1.8 wt.-%, and more preferably from 1.2 to 1.4 wt.-%.
5. The process of any of embodiments 1 to 4, wherein the catalyst obtained in (5) contains Cu, calculated as CuO, in an amount ranging from 5 to 150 g/ft$^3$, preferably from 15 to 100 g/ft$^3$, more preferably from 25 to 70 g/ft$^3$, more preferably from 35 to 50 g/ft$^3$, more preferably from 40 to 46 g/ft$^3$, and more preferably from 43 to 44 g/ft$^3$.
6. The process of any of embodiments 1 to 5, wherein the slurry obtained in (3) contains Fe, calculated as $Fe_2O_3$, in an amount ranging from 0.1 to 8 wt.-% based on 100 wt.-% of the calcined slurry, preferably from 0.5 to 7 wt.-%, more preferably from 1 to 6 wt.-%, more preferably from 1.5 to 5 wt.-%, more preferably from 2 to 4.5 wt.-%, more preferably from 2.5 to 4 wt.-%, more preferably from 3 to 3.6 wt.-%, and more preferably from 3.2 to 3.4 wt.-%.
7. The process of any of embodiments 1 to 6, wherein the catalyst obtained in (5) contains Fe, calculated as $Fe_2O_3$, in an amount ranging from 5 to 400 g/ft$^3$, preferably from 10 to 300 g/ft$^3$, more preferably from 30 to 250 g/ft$^3$, more preferably from 50 to 200 g/ft$^3$, more preferably from 80 to 170 g/ft$^3$, more preferably from 100 to 150 g/ft$^3$, more preferably from 110 to 135 g/ft$^3$, and more preferably from 120 to 125 g/ft$^3$.
8. The process of any of embodiments 1 to 7, wherein X is selected from the group consisting of Al, B, In, Ga, and combinations of two or more thereof, preferably from the group consisting of Al, B, In, and combinations of two or more thereof, wherein more preferably X stands for Al and/or B, X preferably being Al.
9. The process of any of embodiments 1 to 8, wherein the zeolitic material provided in (1) displays an $SiO_2:X_2O_3$ molar ratio in the range of from 1 to 200, preferably from 5 to 120, more preferably from 10 to 80, more preferably from 15 to 50, more preferably from 20 to 40, more preferably from 25 to 35, and more preferably from 28 to 30.
10. The process of any of embodiments 1 to 9, wherein the zeolitic material provided in (1) comprises at most 1000 ppm, preferably from 0 to 100 ppm, and more preferably from 0 to 10 ppm of copper, calculated as the element.
11. The process of any of embodiments 1 to 10, wherein the one or more copper(II) containing compounds are selected from the group consisting of CuO, copper(II) chloride, copper(II) bromide, copper(II) perchlorate, copper(II) sulfite, copper(II) hydrogensulfate, copper (II) sulfate, copper(II) nitrite, copper(II) nitrate, copper (II) dihydrogenphosphate, copper(II) hydrogenphosphate, copper(II) phosphate, copper(II) hydrogencarbonate, copper(II) carbonate, copper(II) acetate, copper(II) citrate, copper(II) malonate, copper (II) oxalate, copper(II) tartrate, and mixtures of two or more thereof, preferably from the group consisting of CuO, copper(II) chloride, copper(II) sulfate, copper(II) nitrate, copper(II) acetate, and mixtures of two or more thereof, wherein more preferably the copper(II) containing compound is CuO.
12. The process of any of embodiments 1 to 11, wherein ion exchange in (2) is conducted in a solvent system comprising one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.
13. The process of any of embodiments 1 to 12, wherein ion exchange in (2) is conducted at a temperature in the range of from 20 to 100° C., preferably from 30 to 90° C., more preferably from 40 to 80° C., more preferably from 50 to 70° C., and more preferably from 55 to 65° C.
14. The process of any of embodiments 1 to 13, wherein ion exchange in (2) is conducted for a duration in the range of from 0.15 to 10 h, preferably from 0.25 to 5 h, more preferably from 0.5 to 3 h, and more preferably from 0.75 to 1.5 h.
15. The process of any of embodiments 1 to 14, wherein the one or more iron (II) and/or iron (III) containing compounds are selected from the group consisting of iron sulfate, iron sulfite, iron hydrogensulfate, iron chloride, iron bromide, iron iodide, iron fluoride, iron perchlorate, iron nitrate, iron nitrite, iron phosphate, iron dihydrogenphosphate, iron hydrogenphosphate, iron carbonate, iron hydrogencarbonate, iron acetate, iron citrate, iron malonate, iron oxalate, iron tartrate, hexacyanoferrate salts, ferrocene, and ferrocenium salts, including combinations of two or more thereof, preferably from the group consisting of iron (III) nitrate, iron (II) acetate, ammonium iron (III) citrate, iron (II) sulfate, and iron (II) oxalate, including combinations of two or more thereof, wherein more preferably iron (III) nitrate and/or iron (II) acetate is employed as the one or more iron (II) and/or iron (III) containing compounds.
16. The process of any of embodiments 1 to 15, wherein the solvent system in (3) comprises one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.
17. The process of any of embodiments 1 to 16, wherein the slurry obtained in (3) displays a solids content of 15 to 75 wt.-% based on 100 wt.-% of the slurry, preferably from 20 to 65 wt.-%, more preferably from 25 to 60 wt.-%, more preferably from 30 to 55 wt.-%, more preferably from 33 to 50 wt.-%, more preferably from 35 to 45 wt.-%, and more preferably from 38 to 42 wt.-%.
18. The process of any of embodiments 1 to 17, wherein the slurry prepared in (3) further comprises one or more binders, preferably one or more binders based on Al, Si, and/or Zr, preferably on Al and/or Zr, and more preferably based on Zr, wherein more preferably the slurry prepared in (3) further contains one or more sources of $ZrO_2$ as a binder, wherein the one or more sources of $ZrO_2$ preferably comprise one or more zirconium salts, more preferably one or more zirconium salts selected from the group consisting of zirconyl chloride, zirconium acetate, zirconium acetylacetonate, zirconium hydroxide, zirconium oxynitrate, zirconium carbonate, and zirconium oxychloride, including mixtures of two or more thereof, more preferably from the group consisting of zirconium acetate, zirconium acetylacetonate, zirconium hydroxide, and zirconium carbonate, including mixtures of two or more thereof, wherein more preferably the one or more zirconium salts comprise zirconium acetate, wherein more preferably the slurry prepared in (3) further comprises zirconium acetate as a binder.
19. The process of embodiment 18, wherein the slurry comprises the one or more binders in an amount ranging from 0.5 to 15 wt.-% based on 100 wt.-% of the calcined slurry, preferably from 1 to 10 wt.-%, more preferably from 3 to 7 wt.-%, more preferably from 4 to 6 wt.-%, and more preferably from 4.5 to 5.5 wt.-%.
20. The process of any of embodiments 1 to 19, wherein the slurry prepared in (3) further comprises one or more buffering agents, wherein the one or more buffering agents preferably comprise ammonium acetate, wherein more preferably ammonium acetate is employed as the one or more buffering agents.
21. The process of embodiment 20, wherein the pH of the slurry prepared in (3) is adjusted to a pH in the range of from 3 to 6 with the one or more buffering agents, preferably to a pH in the range of from 3.5 to 5.5, preferably of from 3.8 to 5.2, more preferably of from 4.1 to 4.9, more preferably of from 4.3 to 4.7, and more preferably of from 4.4 to 4.6.
22. The process of any of embodiments 1 to 21, wherein prior to the coating of the slurry in (4), the slurry obtained in (3) is maintained at a temperature in the range of from 5 to 60° C., preferably in the range of from 10 to 50° C., more preferably in the range of from 15 to 45° C., more preferably in the range of from 18 to 30° C., and more preferably in the range of from 20 to 25° C.
23. The process of embodiment 22, wherein the slurry is maintained at the temperature for a duration in the range of from 0.1 to 72 h, preferably of from 0.5 to 48 h, more preferably of from 1 to 36 h, more preferably of from 3 to 30 h, more preferably of from 6 to 24 h, more preferably of from 10 to 20 h, more preferably of from 12 to 18 h, and more preferably of from 14 to 16 h.
24. The process of any of embodiments 1 to 23, wherein the substrate provided in (4) is a wall-flow or a flow-through substrate, preferably a wall-flow or a flow-through honeycomb substrate, and more preferably a flow-through honeycomb substrate.
25. The process of any of embodiments 1 to 24, wherein the substrate provided in (4) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite
26. The process of any of embodiments 1 to 25, wherein after (4) and prior to calcination in (5), the coated substrate is dried in a gas atmosphere having a temperature in the range of from 80 to 250° C., preferably in the range of from 90 to 200° C., more preferably in the range of from 100 to 150° C., more preferably in the range of from 110 to 130° C., the gas atmosphere more preferably being air.
27. The process of embodiment 26, wherein drying is performed for a duration in the range of from 10 to 180 minutes, preferably in the range of from 20 to 120 minutes, more preferably in the range of from 30 to 90 minutes, more preferably in the range of from 40 to 80 minutes.
28. The process of any of embodiments 1 to 27, wherein calcination in (5) is conducted at a temperature in the range of from 350 to 800° C., preferably in the range of from 400 to 700° C., more preferably in the range of from 450 to 650° C., and more preferably in the range of from 500 to 600° C.
29. The process of any of embodiments 1 to 28, wherein calcination in (5) is conducted for a duration in the range of from in the range of from 10 to 180 minutes, preferably in the range of from 20 to 120 minutes, more preferably in the range of from 30 to 90 minutes, more preferably in the range of from 40 to 80 minutes.
30. The process of any of embodiments 1 to 29, wherein calcination in (5) is conducted in a gas atmosphere containing air, wherein preferably calcination in (5) is conducted in air.
31. The process of any of embodiments 1 to 30, wherein the process consists of (1), (2), (3), (4) and (5).
32. A catalyst for the selective catalytic reduction of nitrogen oxide obtainable and/or obtained according to the process of any of embodiments 1 to 31.
33. An exhaust gas treatment system for the treatment of exhaust gas exiting from an internal combustion engine, preferably from a diesel engine, the system comprising a catalyst for the selective catalytic reduction of nitrogen oxide according embodiment 32 and one or more of a diesel oxidation catalyst, an ammonia oxidation catalyst, a selective catalytic reduction catalyst, a catalyzed soot filter and a SCR/AMOx catalyst.
34. The system of embodiment 33 comprising a diesel oxidation catalyst, a catalyzed soot filter and the catalyst for the selective catalytic reduction of nitrogen oxide, wherein the diesel oxidation catalyst is positioned upstream of the catalyzed soot filter and wherein the catalyzed soot filter is positioned upstream of the catalyst for the selective catalytic reduction of nitrogen oxide; wherein the diesel oxidation catalyst preferably is the first catalyst of the system and preferably no catalyst is present between the engine and the diesel oxidation catalyst.
35. The system of embodiment 34, wherein the system further comprises a selective catalytic reduction catalyst which is positioned downstream of the catalyst for the selective catalytic reduction of nitrogen oxide; wherein the system preferably further comprises an ammonia oxidation catalyst, said ammonia oxidation catalyst being positioned downstream of the selective catalytic reduction catalyst.
36. The system of embodiment 34 or 35 further comprising a reductant injector, the reductant injector being positioned downstream of the catalyzed soot filter and upstream of the catalyst for the selective catalytic reduction of nitrogen oxide, wherein the reductant preferably is urea.
37. The system of embodiment 33 comprising a diesel oxidation catalyst, a catalyzed soot filter and the catalyst for the selective catalytic reduction of nitrogen oxide, wherein the diesel oxidation catalyst is positioned upstream of the catalyst for the selective catalytic reduction of nitrogen oxide and wherein the catalyst for the selective catalytic reduction of nitrogen oxide is positioned upstream of the catalyzed soot filter; wherein the diesel oxidation catalyst preferably is the first catalyst of the system and preferably no catalyst is present between the engine and the diesel oxidation catalyst.

38. The system of embodiment 37, wherein the system further comprises a selective catalytic reduction catalyst which is positioned downstream of the catalyst for the selective catalytic reduction of nitrogen oxide and upstream of the catalyzed soot filter; wherein the system preferably further comprises an ammonia oxidation catalyst, said ammonia oxidation catalyst being positioned downstream of the selective catalytic reduction catalyst and upstream of the catalyzed soot filter.

39. The system of embodiment 37 or 38, wherein the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

40. The system of any one of embodiments 37 to 39 further comprising a reductant injector, the reductant injector being positioned downstream of the diesel oxidation catalyst and upstream of the catalyst for the selective catalytic reduction of nitrogen oxide, wherein the reductant preferably is urea.

41. The system of embodiment 33 comprising the catalyst for the selective catalytic reduction of nitrogen oxide and a catalyzed soot filter, wherein the catalyst for the selective catalytic reduction of nitrogen oxide is positioned upstream of the catalyzed soot filter; wherein the catalyst for the selective catalytic reduction of nitrogen oxide preferably is the first catalyst of the system and preferably no catalyst is present between the engine and the catalyst for the selective catalytic reduction of nitrogen oxide.

42. The system of embodiment 41, wherein the system further comprises a selective catalytic reduction catalyst which is positioned downstream of the catalyst for the selective catalytic reduction of nitrogen oxide and upstream of the catalyzed soot filter; wherein the system preferably further comprises an ammonia oxidation catalyst, said ammonia oxidation catalyst being positioned downstream of the selective catalytic reduction catalyst and upstream of the catalyzed soot filter.

43. The system of embodiment 41 or 42 further comprising a first reductant injector, the first reductant injector being positioned upstream of the catalyst for the selective catalytic reduction of nitrogen oxide, wherein the reductant preferably is urea.

44. The system of any one of embodiments 41 to 43, wherein the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

45. A method for the selective catalytic reduction of nitrogen oxides, wherein the nitrogen oxides are comprised in an exhaust gas stream, said method comprising (1) providing the exhaust gas stream, preferably from a diesel engine;
(2) passing the exhaust gas stream provided in (1) through a catalyst for the selective catalytic reduction according to embodiment 30 or through an exhaust gas treatment system according to any of embodiments 33 to 44.

46. Use of a catalyst according to embodiment 32 or of an exhaust gas treatment system according to any of embodiments 33 to 44 for the selective catalytic reduction of nitrogen oxide, preferably of nitrogen oxide exiting from a diesel engine.

EXPERIMENTAL SECTION

Reference Example 1: Preparation of a Zeolitic Material Having the CHA-Type Framework Structure Chabazite was prepared according to the procedure described in Comparative Example 1 and step 2.1 of Comparative Example 2 of WO 2011/064186 A1.

Reference Example 2: Preparation of a Zeolitic Material Having the CHA-Type Framework Structure A zeolitic material was prepared according to a synthetic methodology as described in examples 1 and 2 of U.S. Pat. No. 10,315,924 B2 for affording a zeolite displaying a silica to alumina ratio of 28.

Reference Example 3: Cu-CHA Prepared According to a Liquid Phase Ion-Exchange (LPIE) Process The zeolitic material obtained according to Reference Example 1 was ion exchanged with copper essentially according to the procedure disclosed in U.S. Pat. No. 8,293,199 B2, wherein particular reference is made to Inventive Example 2 of U.S. Pat. No. 8,293,199 B2, column 15, lines 31 to 46. The ion exchange was performed such as to obtain a Cu content in the Cu-CHA zeolitic material, calculated as CuO, of 2.35 weight-% based on the weight of Cu-CHA.

Reference Example 4: Cu-CHA Prepared According to a Liquid Phase Ion-Exchange (LPIE) Process The zeolitic material obtained according to Reference Example 2 was ion exchanged with copper according to Reference Example 3, wherein the ion exchange was performed such as to obtain a Cu content in the Cu-CHA zeolitic material, calculated as CuO, of 1.2 weight-% based on the weight of Cu-CHA.

Reference Example 5: General Coating Method

In order to coat a flow-through substrate with a coating, the flow-through substrate was immersed vertically in a portion of a given slurry for a specific length of the substrate which was equal to the targeted length of the coating to be applied. In this manner, the washcoat contacted the walls of the substrate. The sample was left in the slurry for a specific period of time, usually for 1-10 seconds. The substrate was then removed from the slurry, and excess slurry was removed from the substrate by allowing it to drain from the substrate, then by blowing with compressed air (against the direction of slurry penetration).

Comparative Example 1: Preparation of an SCR Catalyst Containing Cu-CHA

A washcoat slurry was prepared by mixing water and Cu-CHA from Reference Example 3 to generate a target 40% by weight solids slurry containing binder. A catalytic coating containing this mixture was deposited via the washcoat process of Reference Example 5 on cellular flow-through ceramic monolith having a cell density of 400 cpsi and a wall thickness of 6 mil. The coated monolith was dried at 110° C. The coating process provided a catalyst loading of 2.1 g/in$^3$.

More specifically, for preparing the washcoat slurry, an aqueous solution of zirconyl acetate was mixed with the Cu-CHA zeolite from Reference Example 3 (5 wt.-% Zr—OAc based on 100 wt.-% of the calcined slurry), and deionized water to form a slurry. The slurry was then disposed over the full length of an uncoated flow-through honeycomb cordierite monolith substrate. Said substrate was coated at a loading of 2.1 g/in$^3$ according to the method described in Reference Example 5. Afterwards, the substrate was dried and then calcined at 550° C. for 60 minutes.

Comparative Example 2: Preparation of an SCR Catalyst Containing Cu-CHA

A coated ceramic monolith was prepared according to the procedure described in Comparative Example 1 using the Cu-Chabazite from Reference Example 4.

Example 1: Preparation of an SCR Catalyst Containing Cu-CHA and 2.0 wt.-% Fe Calculated as Fe$_2$O$_3$ An in-slurry ion exchange process was used to add iron to the Cu-CHA from Reference Example 3 to form a Cu/Fe promoted zeolite (an in-slurry ion-exchange (ISIE) process as described in EP 3 549 913 A1 was used to this effect). In this example, the source of additional Fe, Fe(III) nitrate, was used to add Fe content to the required level in the slurry, and subsequently mixed thoroughly for in-slurry ion-exchange to be completed.

More specifically, a coated ceramic monolith was prepared according to Comparative Example 1, wherein when preparing the washcoat slurry, Fe(III) nitrate was further added in an amount such as to obtain an Fe content in the slurry, calculated as Fe$_2$O$_3$, of 2.0 weight-% based on the weight of the calcined slurry. The Fe:Cu molar ratio of the total amount of iron comprised in the slurry to the total amount of copper contained in the Cu ion-exchanged zeolitic material comprised in the slurry was accordingly calculated to 0.85. To this effect, Cu-CHA was mixed with Fe-nitrate and subsequently with 5 wt % Zr-oAc, and NH$_4$-oAc was added to lower the pH to a value of 4.3 to 4.7 (target pH=4.5). The slurry was then let sit overnight before being coated at a loading of 2.1 g/in$^3$ into flow-through substrate.

Example 2: Preparation of an SCR Catalyst Containing Cu-CHA and 3.4 wt.-% Fe Calculated as Fe$_2$O$_3$ A coated ceramic monolith was prepared according to the procedure described in Example 1 using the Cu-Chabazite from Reference Example 4, wherein Fe(III) nitrate was added in an amount such as to obtain an Fe content in the slurry, calculated as Fe$_2$O$_3$, of 3.4 weight-% based on the weight of the calcined slurry. The Fe:Cu molar ratio of the total amount of iron comprised in the slurry to the total amount of copper contained in the Cu ion-exchanged zeolitic material comprised in the slurry was accordingly calculated to 2.83.

Example 2: Testing of the Catalysts in NOx Conversion and N$_2$O Formation

The catalysts of Comparative Examples 1 and 2 as well as of Examples 1 and 2 were tested in the fresh and hydrothermally aged states. Hydrothermal treatment of the coated monoliths was performed with steam, and was achieved by allowing an approximately 10% O$_2$, 10% H$_2$O in N$_2$ flow over the monolith at the required temperature (650° C.) at space velocity of 9000 h$^{-1}$ for the specified amount of time (50 hours).

SCR Testing Conditions:
 Space velocity (SV)=80 k h$^{-1}$, Temperatures: 250° C., 200° C.
 Standard SCR Gas feed: 550 ppm NH$_3$, 500 ppm NO, 5% H$_2$O, 10% O$_2$, balance N$_2$
 Fast SCR Gas feed: 500 ppm NH$_3$, 250 ppm NO, 250 ppm NO$_2$, 5% H$_2$O, 10% O$_2$, balance N$_2$ The results from catalyst testing of the catalyst samples in the fresh and aged states under standard and fast SCR conditions are shown in Tables 1 and 2 below, respectively.

TABLE 1

Results from catalyst testing under standard SCR conditions.

| | Catalyst composition | | | Standard SCR conditions | | | |
| | | | | Fresh catalyst | | Aged catalyst | |
| Example | Component | Wt % CuO | Wt % Fe2O3 | 250 C. NOx conversion | Max N2O (ppm) | 250 C. NOx conversion | Max N$_2$O (ppm) |
| --- | --- | --- | --- | --- | --- | --- | --- |
| Comp. Ex. 1 | CuCHA | 2.35 wt % | — | 77% | 5 ppm | 80% | 10 ppm |
| Ex. 1 | Fe-ISIE CuCHA | 2.35 wt % | 2.0 wt % | 81% | 5 ppm | 80% | 8 ppm |
| Comp. Ex. 2 | CuCHA | 1.2 wt % | — | 35% | 1.7 ppm | 34% | 4.8 ppm |
| Ex. 2 | Fe-ISIE CuCHA | 1.2 wt % | 3.4 wt % | 39% | 3.3 ppm | 49% | 4.4 ppm |

TABLE 2

Results from catalyst testing under fast SCR conditions.

| | Catalyst composition | | | Fast SCR conditions | | | |
| | | | | Fresh catalyst | | Aged catalyst | |
| Example | Component | Wt % CuO | Wt % Fe2O3 | 200 C. NOx conversion | Max N$_2$O (ppm) | 200 C. NOx conversion | Max N$_2$O (ppm) |
|---|---|---|---|---|---|---|---|
| Comp. Ex. 1 | CuCHA | 2.35 wt % | — | 74% | 16 ppm | 85% | 19 ppm |
| Ex. 1 | Fe-ISIE CuCHA | 2.35 wt % | 2.0 wt % | 83% | 12 ppm | 83% | 17 ppm |
| Comp. Ex. 2 | CuCHA | 1.2 wt % | — | 63% | 9.3 ppm | 28% | 10 ppm |
| Ex. 2 | Fe-ISIE CuCHA | 1.2 wt % | 3.4 wt % | 85% | 9 ppm | 72% | 12.2 ppm |

Thus, as may be taken from the results shown in Tables 1 and 2, although Cu-CHA offers excellent NOx conversion under standard and fast conditions, its use leads to high N$_2$O make, wherein the level of N$_2$O make is correlated to the amount of Cu-CHA employed. As may further be taken from the results shown in Tables 1 and 2, it has surprisingly been found that the addition of iron to the slurry during the preparation of the catalyst lowers the N$_2$O make, in particular when using higher loadings of copper in the zeolite such as in Example 1. Quite unexpectedly, however, it has been found according to the present invention that when using lower loadings of copper in the Cu-CHA, the NOx conversion of the resulting catalyst may be boosted by the addition of iron to the slurry during the preparation of the catalyst, without increasing the relatively low N$_2$O make. As may be taken from the results displayed in Table 2, this is particularly apparent under fast SCR conditions, wherein in the fresh catalyst, the NOx conversion rate observed for Comparative Example 2 with a copper loading of 1.2 wt.-% is boosted to a level even exceeding the activity observed for Example 1 in the fresh state when adding iron to the slurry in accordance with Example 2. Said effect is also quite apparent in the aged catalyst, wherein the NOx conversion rate of 28% for the Cu-CHA catalyst of Comparative Example 2 is boosted to 72% by the addition of iron according to Example 2, without leading to a corresponding increase of the N$_2$O make.

Accordingly, it has quite surprisingly been found that by adding iron to the slurry, the amount of copper in the Cu-CHA may be lowered for achieving a lower N$_2$O make without however sacrificing the NOx conversion activity of the resulting catalyst as might have been expected. As a result, it has quite unexpectedly been found that by employing a Cu-CHA catalyst with low loadings of copper and adding iron to the Cu-CHA slurry during the preparation of the supported catalyst, the invention is able to provide an optimum balance between high NOx conversion and low N$_2$O make, in particular under fast SCR conditions.

CITED LITERATURE

WO 2016/070090 A1
US 2011/0305614 A1
WO 2017/153894 A1
WO 2015/101930 A1
WO 2017/134581 A1
WO 2018/10718 A
WO 2011/064186 A1
U.S. Pat. No. 10,315,924 B2
U.S. Pat. No. 8,293,199 B2
EP3 549 913 A1

The invention claimed is:

1. A process for preparing a catalyst for the selective catalytic reduction of nitrogen oxide comprising
   (1) providing a zeolitic material comprising SiO$_2$ and X$_2$O$_3$ in its framework structure, wherein X is a trivalent element;
   (2) subjecting the zeolitic material provided in (1) to an ion exchange procedure with one or more copper (II) containing compounds;
   (3) preparing a slurry comprising the Cu ion-exchanged zeolitic material obtained in (2), one or more iron (II) and/or iron (III) containing compounds, and a solvent system;
   (4) providing a substrate and coating the slurry obtained in (3) onto the substrate;
   (5) calcining the coated substrate obtained in (4);
   wherein the Fe:Cu molar ratio of the total amount of iron comprised in the slurry prepared in (3), to the total amount of copper contained in the Cu ion-exchanged zeolitic material comprised in the slurry prepared in (3), is comprised in a range of from 0.1 to 15.

2. The process of claim 1, wherein the zeolitic material has a framework structure selected from the group consisting of LTA, AFT, AFV, SAV, SFW, TSC, FAU, MFI, BEA, FER, MOR, CHA, AEI, RTH, LEV, DDR, KFI, ERI, and AFX, including mixed structures of two or more thereof.

3. The process of claim 1, wherein the Cu ion-exchanged zeolitic material obtained in (2) contains Cu, calculated as CuO, in an amount ranging from 0.1 to 8 wt.-% based on 100 wt.-% of SiO$_2$, Al$_2$O$_3$, and Cu, calculated as CuO, in the Cu ion-exchanged zeolitic material.

4. The process of claim 3, wherein the slurry obtained in (3) contains Fe, calculated as Fe$_2$O$_3$, in an amount ranging from 0.1 to 8 wt.-% based on 100 wt.-% of the calcined slurry.

5. The process of claim 1, wherein X is selected from the group consisting of Al, B, In, Ga, and combinations of two or more thereof.

6. The process of claim 1, wherein the zeolitic material provided in (1) displays an SiO$_2$:X$_2$O$_3$ molar ratio in a range of from 1 to 200.

7. The process of claim 1, wherein the slurry prepared in (3) further comprises one or more binders.

8. A catalyst for the selective catalytic reduction of nitrogen oxide obtainable and/or obtained according to the process of claim 1.

9. An exhaust gas treatment system for the treatment of exhaust gas exiting from an internal combustion engine, the system comprising a catalyst for the selective catalytic reduction of nitrogen oxide according claim 8 and one or more of a diesel oxidation catalyst, an ammonia oxidation catalyst, a selective catalytic reduction catalyst, a catalyzed soot filter, and a SCR/AMOx catalyst.

10. The system of claim 9 comprising a diesel oxidation catalyst, a catalyzed soot filter and the catalyst for the selective catalytic reduction of nitrogen oxide, wherein the diesel oxidation catalyst is positioned upstream of the catalyzed soot filter and wherein the catalyzed soot filter is positioned upstream of the catalyst for the selective catalytic reduction of nitrogen oxide.

11. The system of claim 9 comprising a diesel oxidation catalyst, a catalyzed soot filter and the catalyst for the selective catalytic reduction of nitrogen oxide, wherein the diesel oxidation catalyst is positioned upstream of the catalyst for the selective catalytic reduction of nitrogen oxide and wherein the catalyst for the selective catalytic reduction of nitrogen oxide is positioned upstream of the catalyzed soot filter.

12. The system of claim 9 comprising the catalyst for the selective catalytic reduction of nitrogen oxide and a catalyzed soot filter, wherein the catalyst for the selective catalytic reduction of nitrogen oxide is positioned upstream of the catalyzed soot filter.

13. A method for the selective catalytic reduction of nitrogen oxides, wherein the nitrogen oxides are comprised in an exhaust gas stream, said method comprising (1) providing the exhaust gas stream;

(2) passing the exhaust gas stream provided in (1) through a catalyst for the selective catalytic reduction according to claim 8.

14. A method for the selective catalytic reduction of nitrogen oxides, wherein the nitrogen oxides are comprised in an exhaust gas stream, said method comprising (1) providing the exhaust gas stream;

(2) passing the exhaust gas stream provided in (1) through an exhaust gas treatment system according to claim 9.

* * * * *